(12) United States Patent
Marty

(10) Patent No.: US 7,786,892 B2
(45) Date of Patent: Aug. 31, 2010

(54) METHOD FOR INTERPRETATION OF A RADIO-ELECTRICAL COMMAND

(75) Inventor: Jacques Marty, Montredon-Labessonnie (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/510,127

(22) PCT Filed: Apr. 11, 2003

(86) PCT No.: PCT/IB03/01455

§ 371 (c)(1),
(2), (4) Date: Oct. 4, 2004

(87) PCT Pub. No.: WO03/088486

PCT Pub. Date: Oct. 23, 2003

(65) Prior Publication Data

US 2005/0151668 A1     Jul. 14, 2005

(30) Foreign Application Priority Data

Apr. 16, 2002 (FR) .................................. 02 04742

(51) Int. Cl.
*G08C 19/00* (2006.01)
(52) U.S. Cl. .................. 340/825.77; 340/5.7; 340/5.64
(58) Field of Classification Search ............... 340/5.72, 340/5.61, 5.64, 426.13, 426.24, 825.77, 5.7, 340/952, 7.37, 825.43; 342/118, 127; 455/107, 455/41.2, 41.1
See application file for complete search history.

(56) References Cited

U.S. PATENT DOCUMENTS

| | | | |
|---|---|---|---|
| 2,597,518 A | 5/1952 | Parks | |
| 3,182,314 A | 5/1965 | Kleist et al. | |
| 3,553,699 A | 1/1971 | Starkey et al. | |
| 3,697,997 A | 10/1972 | Cooper | |
| 3,715,660 A | 2/1973 | Ruhnke | |
| 4,016,553 A | 4/1977 | Novikoff et al. | |
| 4,750,118 A | 6/1988 | Heitschel et al. | |
| 4,876,549 A | 10/1989 | Masheff | |

(Continued)

FOREIGN PATENT DOCUMENTS

DE     10116870     10/2001

(Continued)

OTHER PUBLICATIONS

English translation of abstract of JP 01-223362.

(Continued)

*Primary Examiner*—Vernal U Brown
(74) *Attorney, Agent, or Firm*—Husch Blackwell Sanders Welsh & Katz

(57) ABSTRACT

A method for the interpretation of a radio-lectrical command for equipment in which the command is interpreted as a function of the emission zone is provided. This is achieved whereby the electromagnetic characteristics of the field generated by the radio-electrical command in the vicinity of a device for reception of radio-electrical commands are determined. The characteristics are compared to determine if the point of the radio-electrical command is located in a near-field or in a far-field zone. A command is then carried out as a function of the command received and as a function of the emission zone of the command. This permits the same command to have two meaning for the equipment.

19 Claims, 3 Drawing Sheets

U.S. PATENT DOCUMENTS

| | | | | |
|---|---|---|---|---|
| 5,170,172 A | * | 12/1992 | Weinstein | 342/458 |
| 5,552,641 A | | 9/1996 | Fischer et al. | |
| 5,751,073 A | | 5/1998 | Ross | |
| 5,973,611 A | * | 10/1999 | Kulha et al. | 340/5.62 |
| 6,087,987 A | | 7/2000 | Bachhuber et al. | |
| 6,208,135 B1 | * | 3/2001 | Shattil | 324/225 |
| 6,218,932 B1 | | 4/2001 | Stippler | |
| 6,219,613 B1 | * | 4/2001 | Terrier et al. | 701/207 |
| 6,424,820 B1 | * | 7/2002 | Burdick et al. | 455/41.1 |
| 6,538,559 B1 | * | 3/2003 | Okada | 340/5.72 |
| 6,906,612 B2 | * | 6/2005 | Ghabra et al. | 340/5.61 |
| 2001/0005170 A1 | * | 6/2001 | Heide et al. | 340/5.61 |
| 2001/0038328 A1 | * | 11/2001 | King et al. | 340/5.64 |

FOREIGN PATENT DOCUMENTS

| | | |
|---|---|---|
| EP | 0921507 | 6/1999 |
| JP | 01-223362 | 9/1989 |
| JP | 05-301561 | 11/1993 |
| WO | WO 98/02860 | 1/1998 |

OTHER PUBLICATIONS

English translation of abstract of JP 05-301561.

* cited by examiner

METHOD FOR INTERPRETATION OF A RADIO-ELECTRICAL COMMAND

FIELD OF THE INVENTION

The invention concerns the field of remote control between a command transmitter and a command receiver of the radio-electrical type. More particularly, the invention relates to applications in which at least one operating mode requires a proximity relation between these devices, particularly in the fields of access control, whether for a building, an automobile or functionalities of equipment operated by such remote control.

The invention relates more particularly to a method for interpreting a radio-electrical command according to its transmission zone. The invention also relates to a device for receiving commands.

BACKGROUND OF THE INVENTION

Equipment for the motorization of garage doors or entries with radiofrequency control, as described in U.S. Pat. No. 4,750,118, generally contains a push-button used to set the command receiver into a learning mode. Once it has been placed in the learning mode, the command receiver can thus record the identifier of the first command transmitter to be actuated, which then becomes valid for controlling the actions of the element operated by the command receiver. The security of this learning mode derives from the fact that the equipment is placed inside the property, and that only the property owner is supposed to be able to access the push-button. It is clear that it is necessary to shorten the duration of this learning mode in order to avoid learning a remote transmitter transmitting in the same time slot. The ideal situation would be to require continuous pushing on the button of the command receiver while pressing on a key of the command transmitter to be paired up, but this method is scarcely convenient. For reasons of cost and ergonomics, it may therefore be desirable to do without such a push-button belonging to the command receiver, and to directly use the mobile remote-control constituting the command transmitter. In this particular learning mode, it will then be necessary to ensure that the two elements are only a few centimeters or tens of centimeters apart.

As described in EP 0 921 507, it is known to reduce the sensitivity of the receivers. It is clear, however, that such a receiver with reduced sensitivity may be illegitimately operated by a very high power transmitter.

In a related field, the gates for locking industrial or commercial closures require an operation of the "deadman's" type, commonly produced by using a monostable key switch. Providing this switch in proximity to the gate guarantees that the user can see the device as it moves, in order to avoid any accident. For reasons of vandalism and convenience, it would be desirable to be able to replace this lock-and-key assembly by a simple remote-control (which can furthermore be used for other applications such as controlling the lighting and solar protection). In the "deadman's" mode, it is therefore essential for this remote-control to work only in proximity to the command receiver, which may be arranged in the masonry or behind a glazing so as to prevent any vandalism.

There is therefore a need for a method and means which guarantee that a command transmitter of the radio-electrical type, the normal range of which is between about ten and several hundred meters, to be located in the immediate proximity of the command receiver in order to validate the transmission of particular commands. This method and these means should under no circumstances be illegitimately operated by a very high power remote transmitter.

Differential measurement carried out on two antennas placed a distance apart is well known to the person skilled in the art for determining the direction of a far-field transmitter according to the methods of radiogoniometry. In a conventional installation, two generally perpendicular coils may be used which can be oriented by rotation about their common diameter. The direction of the transmission is found when the received signals are equal. This direction may also be determined from the ratio of the intensities received by each coil, if these are fixed.

U.S. Pat. No. 3,553,699 describes an instrument for detecting the direction of a radio source, in which these two perpendicular fixed antennas are combined with Hall effect sensors that are used as modulators.

It will be noted that these installations required two perpendicular coils, and that they are not used either for measuring distance or for detecting proximity of the source.

For the field of angular determination, it is possible to provide antennas which this time are placed a distance apart and in the same plane, but by using direct phase-shift measurements on the received signals, as described in U.S. Pat. No. 3,697,997, or by alternatively by cross-correlation as in U.S. Pat. No. 4,876,549.

These fairly complex methods cannot in any event be utilized for measuring distance or for detecting proximity of the source, since a phase-shift measurement can only be used to within an integer number of wavelengths.

For applications relating to access control, it has nevertheless been envisaged to provide a plurality of communication modes between a mobile transponder and a fixed receiver. For instance, U.S. Pat. No. 5,552,641 describes an automobile security system. It will be noted that the system contains two antennas that can be used in reception and can be arranged in a common plane when, for example, they are placed in the external rear-view mirrors of the vehicle. But each antenna is individually connected to at least one HF or LF radio receiver. The intended object is, in particular, to provide sufficient redundancy to guarantee good transmission on at least one of the communication circuits, between the base fixed in the automobile and the mobile transponder. According to that invention, it is possible to determine which door to open according to the receiver which is activated.

For the same type of application, U.S. Pat. No. 5,751,073 describes an RFA activation module which may include two antennas, one of which is intended for detecting the transmitter outside, while the other is intended for detecting it inside. The transmitter may be a transponder.

Lastly, U.S. Pat. No. 6,087,987 describes a method for locating a validation component (transponder) inside an automobile passenger compartment. This method is based on measuring the amplitudes or intensities of fields which are individually measured by at least two transmitter-receivers arranged in the passenger compartment, each of these transmitter-receivers therefore being provided with a device for measuring intensity.

It will be noted that both of these patents use the fact that a "remote" link to a transporter has a short range, for example limited to one meter. No use is made of any near-field relations. For example, column 4, lines 53-59 of U.S. Pat. No. 6,087,987 states that the received power decreases quadratically with the distance. Such a decrease as $1/r^2$ (where r is the distance from the transmitter to the receiver) is characteristic of far-field conditions, while the decrease is as $1/r$ in the near field, as is known to the person skilled in the art and is mentioned, for example, in "Reference Data for Engineers—Ninth Edition—Marc E. Van Valkenburg, Wendy M. Middleton—Newnes", pages 32-7.

The device described in U.S. Pat. No. 6,087,987 can very well be illegitimately operated by a bogus transponder which would contain both a highly sensitive receiver and a very high power transmitter and would be located outside the vehicle, even at tens of meters from it. This is because, ignoring the effects of attenuation due to the metal car body, each of the receivers will then receive a signal of virtually equal power and the system will logically conclude that there is a transponder in the middle of the passenger compartment.

In the field of theft detection, or more generally remote electronic identification (RFID), it has been envisaged to use discrimination characteristics associated with the field characteristics involving constructive or destructive interference between a plurality of antennas which constitute an array. For instance, U.S. Pat. No. 4,016,553 describes a device in which at least two transmission coils, contained in two parallel planes, are serially connected in a crossed fashion. The dimensions of the coils and the spacing between them are very small here relative to the wavelength (for example a tenth of the wavelength). In the case of a far-field distance (a few meters), there are therefore destructive interferences between the waves transmitted by the two coils. In other words, the "interrogation zone" is limited to the vicinity of the transmission system (circle $E_T$ in FIG. 1) which avoids radiating the electromagnetic energy in a large perimeter and makes it possible to comply with the regulations governing this. In the same way, an identical device is used for reception. Therefore, the presence of an element that perturbs the field will be picked up inside the circle $E_R$. Any perturbing transmission that comes from far-field points will not be detected by this arrangement.

Patent Application DE 101 16 870 discloses a device comprising a command transmitter and a command receiver. The receiver comprises means for locating the transmitter by measuring the level of the signals constituting the commands which it receives, and it interprets these commands as a function of the location of the transmitter with respect to the receiver.

U.S. Pat. No. 5,170,172 discloses a device for indicating the distance between a transmitter and a receiver of radio-electrical signals. The receiver comprises a plurality of radio antennas which are preferably arranged mutually orthogonally in order to make it possible to obtain a good image of the power of the radio-electrical signal, irrespective of the orientation of the receiver.

In the field of meteorology, U.S. Pat. No. 3,715,660 describes a device intended to measure the distance separating it from the lightning strikes during a thunderstorm. The device comprises an antenna of the coil type for measuring the magnetic component of the electromagnetic wave produced by the lightning strike, and an antenna of the quarter-wave type for measuring the electric component of the wave. Analysis of the ratio between these two quantities makes it possible to determine the distance to the source of the magnetic wave.

The devices described above do not make it possible to implement a method which guarantees that a command transmitter of the radio-electrical type is located in the immediate proximity of the command receiver, in order to validate transmission of commands, and which guarantees that the device is safe against a very high power transmitter.

It is an object of the invention to provide a device for implementing a method which overcomes this drawback and which improves the methods known in the prior art. In particular, the invention proposes to provide a device for carrying out a method which guarantees that a command transmitter of the radio-electrical type is located in the immediate proximity of the command receiver, in order to validate transmission of commands, and which guarantees that the device is safe against a very high power transmitter.

The concept of a so-called near-field zone and a so-called far-field zone is defined by using the wavelength $\lambda$ of the radio-electrical signal, on the basis of the characteristics of the electromagnetic wave. For antennas whose size is small compared with the wavelength, the transition distance between "near field" and "far field" is $\lambda/2\pi$ (cited ref. pages 32-4). A signal transmitted from a point lying more than $\frac{1}{6}$ of the signal wavelength away from a receiver is then said to be transmitted from a far-field zone. A signal transmitted from a point lying less than $\frac{1}{6}$ of the signal wavelength away from a receiver is said to be transmitted from a near-field zone. In the vicinity of the receiver, the electromagnetic field due to a signal is referred to as far-field if it was transmitted from a far-field zone. In the vicinity of the receiver, the electromagnetic field due to a signal is referred to as near-field if it was transmitted from a near-field zone. For a signal having a frequency of 433 MHz, the transition between near field and far field takes place about 12 cm away from the transmission point.

These theoretical distances therefore depend on the type of antenna. What is important is that a distance can be associated with an electromagnetic characteristic of the field.

BRIEF DESCRIPTION OF THE DRAWINGS

The appended drawings represent, by way of examples, three embodiments of the device for carrying out the method for interpreting a radio-electrical command as a function of its transmission zone.

DETAILED DESCRIPTION

Figure 1:
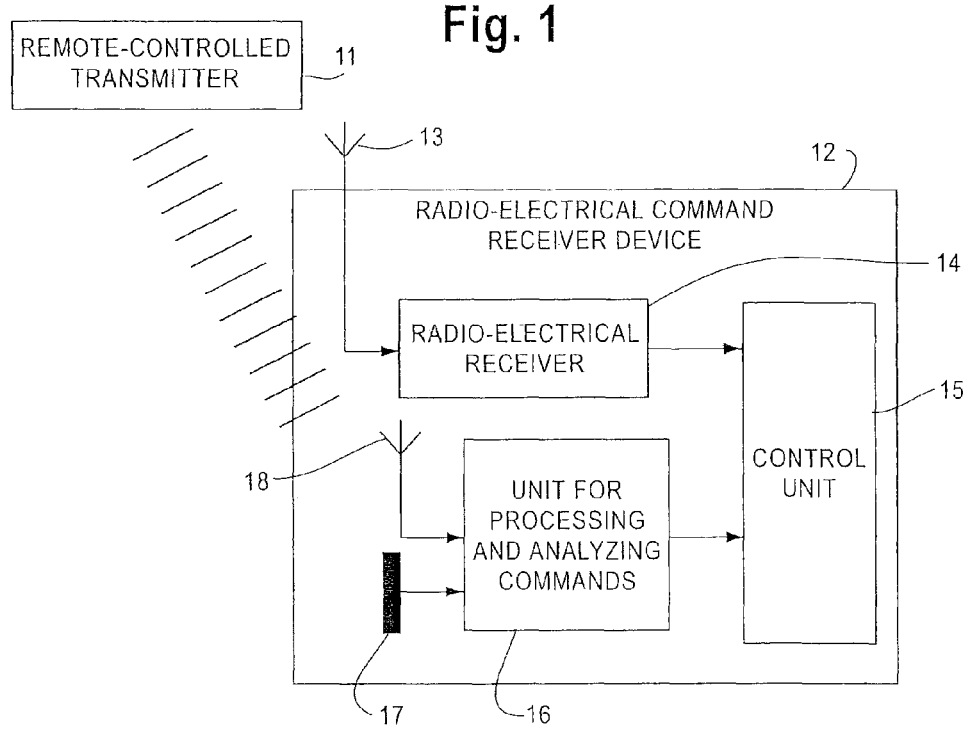
FIG. 1 is a schematic view of a specific embodiment of a radio-electrical command receiver device accompanied by a command transmitter device according to a first embodiment.

The radio-electrical command receiver device 12 represented in FIG. 1 makes it possible to receive radio-electrical commands which are intended to control electrical equipment (not shown) of a building, such as an element for locking, shading or solar protection. This device comprises an antenna 13 referred to as the main antenna, receiving electromagnetic waves of the radio type, a radio-electrical receiver 14 that includes amplification and frequency- or amplitude-demodulation stages, whose input is connected to this antenna 13 and whose output is connected to a unit 15 for controlling the equipment. The circuit consisting of the main antenna 13, the radio-electrical receiver 14 and the control unit 15 makes it possible to carry out an action by using the equipment. This action is associated with a command of radio-electrical nature transmitted by a remote-controlled transmitter 11 and received by the main antenna 13. The radio-electrical command receiver device 12 also comprises a unit 16 for processing and analyzing the commands of radio-electrical nature which are received by two auxiliary antennas 17 and 18. This unit 16 makes it possible to determine whether the radio-electrical command received by the main antenna 13, but also by the two antennas 17 and 18, was transmitted by a remote-control transmitter from a so-called near-field zone or from a so-called far-field zone. The device and the method according to the invention use the properties of near fields and far fields in order to determine the zone from which the radio-electrical command was transmitted. An important characteristic of the power radiated in a near field is that it decreases substantially in inverse proportion to the distance, while this decrease is related to the square of the distance in a far field. It is furthermore known that the electromagnetic composition of the wave changes: for a plane wave or a wave in the far field, the electric field E and the magnetic field H are in a constant ratio (impedance of air equal to $120\pi$, or 377 ohms), while the magnetic component H is predominant in a near field, the substantially constant ratio being reached beyond the transition between near and far field.

In a first embodiment of the device according to the invention, which is represented in FIG. 1, the auxiliary antenna 17 is an antenna of the coil type and the auxiliary antenna 18 is an antenna of the quarter-wave type. When a radio-electrical command is received, the antenna 17 delivers a signal essentially representing the variations of the magnetic field H as a function of time. When a radio-electrical command is received, the antenna 18 delivers a signal representing the variations of the magnetic field H and the electric field E as a function of time. The transmission zone of the radio-electrical command is identified by comparing these two signals, or their powers. If a command has been transmitted from the near-field zone, specifically, then the ratio of power received by the antenna 17/power received by the antenna 18 is substantially greater than if the command was transmitted from the far-field zone. Two auxiliary antennas of different types therefore make it possible, preferably by training, to establish a law variation of received powers as a function of the distance from the source, and therefore to determine the distance by comparing the powers.

It should be noted that if a first auxiliary antenna of the coil type is selected, that is to say one which is sensitive to the magnetic component of the field, then a second auxiliary antenna of any different type may be selected, so long as it is mainly or at least significantly sensitive to the electric field.

Figure 2:
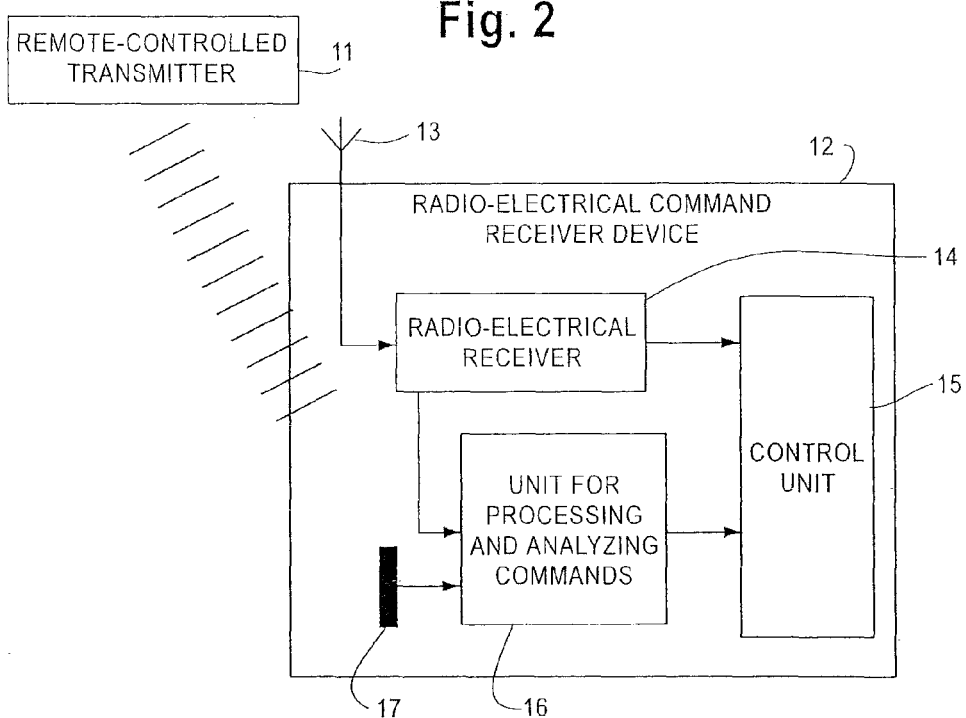
FIG. 2 is a schematic view of a radio-electrical command receiver device accompanied by a command transmitter device according to a second embodiment.

In order to simplify the layout in a second embodiment, which is represented in FIG. 2, one auxiliary antenna is replaced by an output of the radio-electrical receiver 14 that directly gives the power level received at the main antenna 13. These outputs are commonly referred to as RSSI, standing for Received Signal Strength Indicator. For example, the circuit CC1000 marketed by CHIPCON has such an analog output on its terminal 28.

In both of the embodiments described above, the signals output by the antennas may be adjusted so as to obtain a same amplitude at the transition between near field and far field, for example with the aid of potentiometric dividers.

Figure 3:
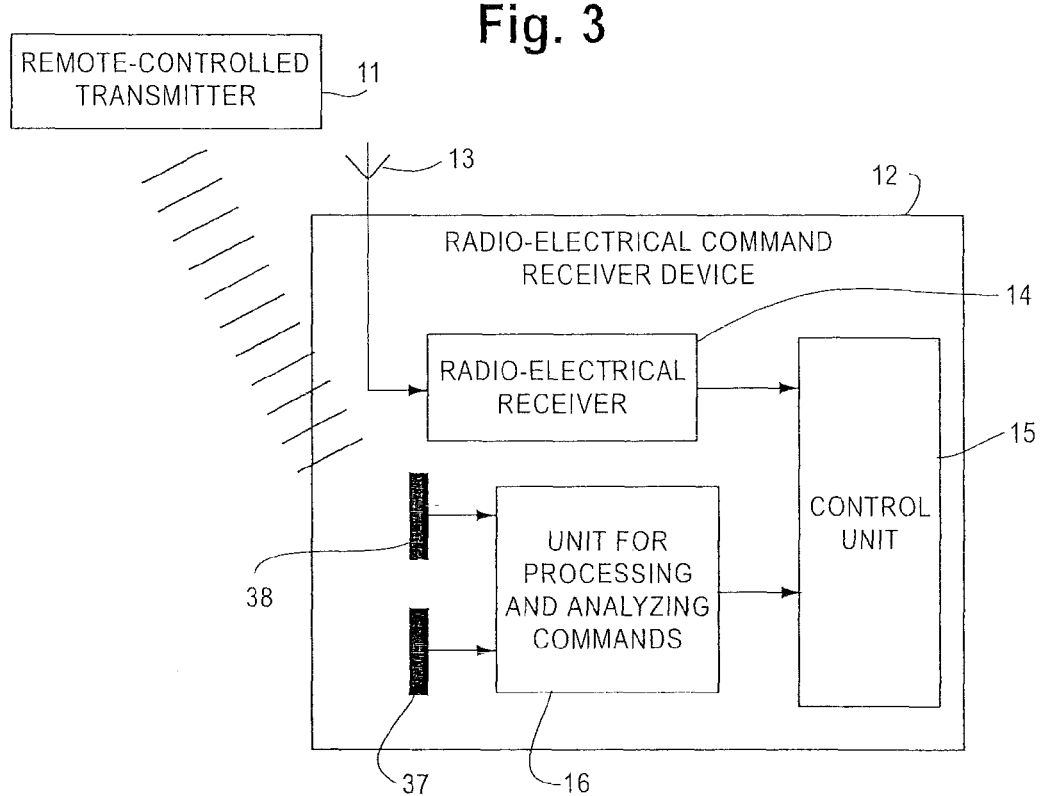
FIG. 3 is a schematic view of a radio-electrical command receiver device accompanied by a command transmitter device according to a third embodiment.

A third embodiment, which is represented in FIG. 3, consists in using two auxiliary antennas 37 and 38 of the same type, namely multiturn coils. These two antennas are arranged substantially one behind the other in the direction coming from the transmission point of the radio-electrical command. The distance between these antennas, which must be selected to be less than the wavelength, leads to a significant decrease of the signal received at the antenna further away from the source so long as the near-field conditions are met. In the case of a distance source, however, the powers received by each coil are almost identical. For example, in the case of a command transmitted at a frequency of 433 MHz and with a distance of 3 cm between the antennas 37 and 38:

if the command is transmitted from a point located 1 m away from the device, then a 6% difference in received power will be detected between the two antennas 37 and 38, if the command is transmitted from a point located 8 cm away from the device, then a 37% difference in received power will be detected between the two antennas 37 and 38.

It is preferable to select two antennas which are substantially coplanar, and each of which is arranged in the form of concentric tracks on the same printed circuit. If need be, using the two faces of the circuit makes it possible to superimpose the two coils perfectly.

In this configuration, the greatest precision for determining the distance from the source will be achieved if the latter is in the plane of the coils, along the axis joining their centers.

Figure 5:
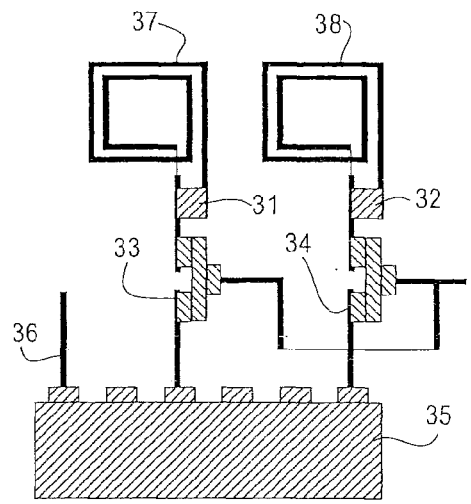
FIG. 5 is a schematic detail view of a radio-electrical command receiver device according to a third embodiment.

This third embodiment will be preferred to the previous one if the radio-electrical receiver 14 does not have an analog output for measuring the power of the signal transmitted by the main antenna 13. This embodiment is extremely simple and very inexpensive: FIG. 5 shows a printed circuit which includes the necessary components using SMD technology: the two auxiliary antennas 37 and 38, tuned to the reception frequency by capacitors 31 and 32, and two transistors 33 and 34 connected in common-collector mode in order to make it possible both to amplify and rectify the current arriving at their base from the antenna. Each transistor's emitter is connected to an analog measuring input of a microcontroller 35. A common ground connection between the two antennas (outputs not connected to the bases of the transistors) and the ground reference of the circuit 35 has not been represented. At the cost of a few extra components, it is similarly and advantageously possible to use a common-emitter layout so as to benefit from voltage amplification. These layouts are known to the person skilled in the art. The main antenna 13 and the radio-electrical receiver have not been represented in this figure. A connection 36 joins the output of this radio-electrical receiver to an input of the microcontroller 35.

In all the embodiments, the signals output by the antennas may be combined before processing, for example by subtractive serial connection. The comparison then relates to the result of the subtraction with respect to a fixed threshold.

In the case of the embodiment with two coils, as is known in the art for other applications (U.S. Pat. Nos. 3,182,314 and 2,597,518), the two coils connected in series may form an 8 of the plane of the printed circuit.

The comparison may be carried out simply with the aid of an analog comparator. For taking the measurement of the amplitudes of the signals, it is also possible to directly use the analog inputs of a controller, if it is for example a microcontroller.

Figure 4:
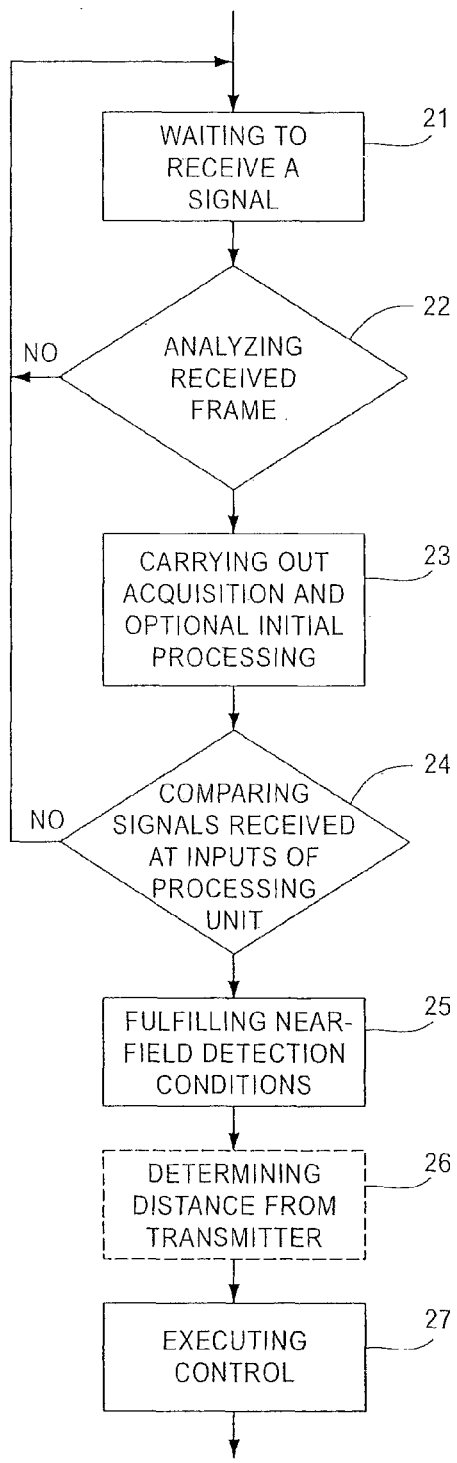
FIG. 4 is a flow chart of a method for determining the transmission zone of a radio-electrical command according to the invention.

A flow chart of the method for interpreting a command is represented in FIG. 4. A first step 21 represents the wait to receive a signal. If a signal is received and demodulated by the receiver, the received frame is analyzed during step 22 in order to find out whether it is a valid frame. If it is, then step 23 is performed during which acquisition and optional initial processing is carried out for the signals received at the inputs of the processing unit 16. The comparison of these signals takes place in step 24. This comparison relates directly to the signals output by the antennas or to the result of processing the data obtained from these signals, so as to obtain an image of the amplitude of the power received at each antenna. If the difference between the amplitudes or powers is greater than a given threshold then step 25 is performed, while step 21 is repeated if it is not. In step 25, the near-field detection conditions are fulfilled: the "proximity" mode is therefore activated in the control unit 15. In the aforementioned case of a device for a garage door or entry, this proximity mode may for example involve learning a new transmitter identifier. During the optional step 26, the difference or ratio of the powers received at the antennas is used to determine the distance from the transmitter, either by virtue of an algorithm which uses a field decay law or by reading from a predefined table, or alternatively by comparison with values acquired in a training phase. These various methods are known to the person skilled in the art. The control contained in the frame picked up by the main antenna 13 and the radio-electrical receiver 14 is executed during step 27. Referring to the same example as above, this command may be a command to pair up, containing the identifier of the command transmitter. The procedure for pairing up can thus be carried out in an extremely simple way. It may of course be any other control, for example an up or down control in operation of the "deadman's" type, the transmitter already being known to the receiver.

Specific embodiments of a method for interpretation of a radio-electrical command according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method for implementing a radio-electrical command transmitted in a single radio-electrical signal, the command being for the control of a home automation device where the command includes at least one of an instruction to move a movable element of the home automation device and a learning-mode instruction of the home automation device, the radio-electrical command being generated by the action of a user on a remote control, the method comprising:
   a command receiver receiving the radio-electrical signal directly from the remote control;
   measuring at least a first electromagnetic characteristic and a second electromagnetic characteristic of the single radio-electrical signal received directly from the remote control;
   comparing the first characteristic to the second characteristic to determine whether a transmission zone of the remote control is a near-field zone or a far-field zone, wherein comparing the first characteristic to the second characteristic includes at least one of calculating a ratio based on the first and second characteristics and calculating a difference based on the first and second characteristics; and
   controlling the movable element as a function of the received command and as a function of the transmission zone of the remote control, wherein, at least in one operating mode, a transmission of commands is validated only when the remote control is in the near-field zone, the near field zone is a zone substantially immediately proximate to the command receiver.

2. The method according to claim 1, wherein determining the electromagnetic characteristics of the radio-electrical signal comprises:
   receiving a first signal that relates to a magnetic component of the radio-electrical signal carrying the radio-electrical command, at two points lying substantially one behind the other and in the direction coming from a transmission point; and
   measuring the amplitude of the first signal at each of said two points.

3. The method according to claim 1, wherein determining the electromagnetic characteristics comprises:
   receiving a first signal that relates to a magnetic component of the radio-electrical signal carrying the radio-electrical command, at two points lying substantially one behind the other in a direction coming from a transmission point; and
   measuring the power of the first signal at each of said two points.

4. The method according to claim 1, wherein determining the electromagnetic characteristics comprises:
   receiving a first signal that relates to a magnetic component of the radio-electrical signal carrying the radio-electrical command, at two points lying substantially one behind the other in a direction coming from a transmission point; and
   measuring a quantity associated with an amplitude of the first signal at each of said two points.

5. The method according to claim 1, wherein determining the electromagnetic characteristics comprises:
   receiving a first signal that relates to a magnetic component of the radio-electrical signal carrying the radio-electrical command, at two points lying substantially one behind the other in a direction coming from a transmission point; and
   measuring a quantity associated with a power of the first signal at each of said two points.

6. The method according to claim 1, wherein determining the electromagnetic characteristics comprises:
   receiving a first signal that relates to a magnetic component of the radio-electrical signal carrying the radio-electrical command at a first point, and receiving a second signal that relates to an electric component of the electromagnetic wave at another point, which may be the same as the first point; and
   measuring an amplitude of each of the first signal and the second signal.

7. The method according to claim 1, wherein determining the electromagnetic characteristics includes:
   receiving a first signal that relates to a magnetic component of the radio-electrical signal carrying the radio-electrical command at a first point, and receiving a second signal that relates to an electric component of the electromagnetic wave at another point, which may be the same as the first point; and
   measuring a power of each of the first signal and the second signal.

8. The method according to claim 1, wherein determining the electromagnetic characteristics comprises:
   receiving a first signal that relates to a magnetic component of the radio-electrical signal carrying the radio-electrical command at a first point, and receiving a second signal that relates to an electric component of the electromagnetic wave at another point, which may be the same as the first point; and
   measuring a quantity associated with an amplitude of each of the first signal and the second signal.

9. The method according to claim 1, wherein determining the electromagnetic characteristics comprises:
receiving a first signal that relates to a magnetic component of the radio-electrical signal carrying the radio-electrical command at a first point, and receiving a second signal that relates to an electric component of the radio-electrical signal at another point, which may be the same as the first point; and
measuring a quantity associated with the power of each of the first signal and the second signal.

10. The method according to claim 1, wherein determining the electromagnetic characteristics comprises:
receiving a first signal that relates to a magnetic component of the radio-electrical signal carrying the radio-electrical command at a first point, and receiving a third signal that relates to a combination of the magnetic component and the electric component of the radio-electrical signal at another point, which may be the same as the first point; and
measuring an amplitude of each of the first signal and the third signal.

11. The method according to claim 1, wherein determining the electromagnetic characteristics comprises:
receiving a first signal that relates to a magnetic component of the radio-electrical signal carrying the radio-electrical command at a first point, and receiving a third signal that relates to a combination of the magnetic component and the electric component of the radio-electrical signal at another point, which may be the same as the first point; and
measuring a power of each of the first signal and the third signal.

12. The method according to claim 1, wherein determining the electromagnetic characteristics comprises:
receiving a first signal that relates to a magnetic component of the radio-electrical signal carrying the radio-electrical command at a first point, and receiving a third signal that relates to a combination of the magnetic component and the electric component of the radio-electrical signal at another point, which may be the same as the first point; and
measuring a quantity associated with an amplitude of each of the first signal and the third signal.

13. The method according to claim 1, wherein determining the electromagnetic characteristic comprises:
receiving a first signal that relates to a magnetic component of the radio-electrical signal carrying the radio-electrical command at a first point, and receiving a third signal that relates to a combination of the magnetic component and the electric component of the radio-electrical signal at another point, which may be the same as the first point; and
measuring a quantity associated with a power of each of the first signal and the third signal.

14. A device for receiving a single radio-electrical signal including a radio-electrical command generated by a user-operable remote control, the remote control being configured to control movement of a movable element of a home automation device, the radio-electrical command including at least one of an instruction for moving the movable element and a learning-mode instruction, the device comprising:
a unit for controlling the equipment;
a radio-electrical wave receiver having a main antenna, at least an amplification stage and a demodulation stage, the output of which is connected to the control unit of the equipment;
means connected to the control unit for comparing first and second electromagnetic characteristics of the single radio-electrical signal to determine whether a transmission zone of the radio-electrical signal is a near-field zone or a far-field zone, having at least two antennas and means for analyzing and/or processing the single radio-electrical signal received directly from the remote control by each antenna so as to determine whether the transmission zone of the radio-electric signal is the near-field zone or the far-field zone, wherein the means for comparing the first electromagnetic characteristic to the second electromagnetic characteristic include at least one of calculating a ratio based on the first and second electromagnetic characteristics and calculating a difference based on the first and second electromagnetic characteristics; and
wherein the antennas forming part of the means for determining the transmission zone are all of the coil type and are substantially arranged one behind the other in the direction coming from a transmission point of the radio-electric wave.

15. The device according to claim 14, wherein the means for determining the transmission zone of the radio-electric command comprises the main antenna and an auxiliary antenna.

16. The device according to claim 14, wherein the means for determining the transmission zone of the radio-electric command comprises two auxiliary antennas.

17. A device for receiving a single radio-electrical signal including a radio-electrical command generated by a user-operable remote control, configured to control movement of a movable element of a home automation device, the radio-electrical command including at least one of an instruction for moving the movable element and a learning-mode instruction, the device comprising:
a unit for controlling the equipment;
a radio-electrical wave receiver having a main antenna, at least an amplification stage and a demodulation stage, the output of which is connected to the control unit of the equipment;
means connected to the control unit for comparing first and second electromagnetic characteristics of the single radio-electrical signal to determine whether a transmission zone of the radio-electrical signal is a near-field zone or a far-field zone, having at least two antennas and means for analyzing and/or processing the radio-electrical signal received directly from the remote control by each antenna so as to determine whether the transmission zone of the radio-electric signal is the near-field zone or the far-field zone, wherein the means for comparing the first electromagnetic characteristic to the second electromagnetic characteristic includes at least one of calculating a ratio based on the first and second electromagnetic characteristics and calculating a difference based on the first and second electromagnetic characteristics; and
where the antennas forming part of the means for determining the transmission zone are of different types.

18. The device according to claim 17, wherein the means for determining the transmission zone of the radio-electric command comprises the main antenna and an auxiliary antenna.

19. The device according to claim 17, wherein the means for determining the transmission zone of the radio-electric command comprises two auxiliary antennas.

* * * * *